(12) United States Patent
Musco

(10) Patent No.: US 6,780,373 B1
(45) Date of Patent: Aug. 24, 2004

(54) METHOD OF MAKING AN EASY OPEN TEAR FILM

(75) Inventor: Carlo E. Musco, Essendon (AU)

(73) Assignee: Cryovac, Inc., Duncan, SC (US)

( * ) Notice: Subject to any disclaimer, the term of this patent is extended or adjusted under 35 U.S.C. 154(b) by 947 days.

(21) Appl. No.: 08/911,983

(22) Filed: Aug. 15, 1997

Related U.S. Application Data

(60) Provisional application No. 60/033,721, filed on Dec. 20, 1996.

(51) Int. Cl.[7] .............................................. B29C 47/06
(52) U.S. Cl. ................ 264/555; 264/210.1; 264/173.14
(58) Field of Search ................................ 426/106, 112, 426/113, 122, 123, 126, 127, 130, 394, 410; 428/34.6, 34.7, 34.8, 35.2, 35.7, 474.4, 475.2, 476.1, 476.3, 910, 510, 512; 264/173.14, 173.19

(56) References Cited

U.S. PATENT DOCUMENTS

| | | | |
|---|---|---|---|
| 2,956,383 A | | 10/1960 | Gausman ...................... 53/124 |
| 3,223,761 A | * | 12/1965 | Raley .......................... 264/514 |
| 3,340,129 A | | 9/1967 | Grevich ....................... 156/498 |
| 3,456,044 A | * | 7/1969 | Pahlke ......................... 264/567 |
| 3,611,657 A | | 10/1971 | Inoue et al. .................... 53/64 |
| 4,095,012 A | | 6/1978 | Schirmer ...................... 428/474 |
| 4,103,473 A | | 8/1978 | Bast et al. ...................... 53/180 |
| 4,506,494 A | | 3/1985 | Shimoyama et al. .......... 53/551 |
| 4,521,437 A | | 6/1985 | Storms ........................ 426/130 |
| 4,532,752 A | | 8/1985 | Taylor .......................... 53/451 |
| 4,532,753 A | | 8/1985 | Kovacs ......................... 53/451 |
| 4,571,926 A | | 2/1986 | Scully .......................... 53/525 |
| 4,589,247 A | | 5/1986 | Tsuruta et al. ................. 53/550 |
| 4,603,793 A | | 8/1986 | Stern ........................... 222/105 |
| 4,724,185 A | * | 2/1988 | Shah .................... 428/476.1 X |
| 5,325,995 A | | 7/1994 | Harrison et al. .............. 222/81 |
| 5,419,795 A | * | 5/1995 | Wood et al. ................ 156/184 |
| 5,468,444 A | * | 11/1995 | Yazaki et al. ................ 264/566 |
| 5,591,390 A | * | 1/1997 | Walton et al. ....... 264/173.14 X |

FOREIGN PATENT DOCUMENTS

| | | |
|---|---|---|
| CA | 1 192 164 | 8/1985 |
| EP | 0 733 471 A2 | 6/1978 |
| EP | 0 173 277 A2 | 5/1986 |
| EP | 0 465 681 A1 | 1/1992 |
| EP | 0733471 * | 9/1996 |
| GB | 1 334 616 | 12/1971 |
| WO | WO 9415981 A1 | 7/1994 |

OTHER PUBLICATIONS

J06114930 Abstract, 1 page.
JP05229079 Abstract, 1 page.

* cited by examiner

*Primary Examiner*—Milton Cano
(74) *Attorney, Agent, or Firm*—Mark B. Quatt

(57) ABSTRACT

A film includes a core layer including a polyamide; two intermediate layers, disposed on opposite surfaces of the core layer, including an adhesive; and two outer layers, each disposed on a surface of the respective intermediate layer, comprising an ethylene/alpha olefin copolymer; wherein the two outer layers each constitute at least 27% of the total thickness of the film. The core layer can include either a single polyamide layer, or three layers wherein two layers of polyamide have therebetween a layer comprising a polymeric adhesive. The film is made preferably by a hot blown process at a blow up ratio of between 2.0:1 and 3.0:1. A process and package are also described.

1 Claim, 2 Drawing Sheets

METHOD OF MAKING AN EASY OPEN TEAR FILM

This application claims the benefit of U.S. Provisional Application No. 60/033,721, filed Dec. 20, 1996.

FIELD OF THE INVENTION

The present invention relates to a film which can be formed into a pouch with an easy open feature. This thermoplastic film can be used to make vertical form/fill/seal (VFFS) packages for a wide variety of food and non-food items.

BACKGROUND OF THE INVENTION

Vertical form/fill/seal (VFFS) packaging systems have proven to be very useful in packaging a wide variety of flowable products. An example of such systems is the ONPACK™ flowable food packaging system sold by W. R. Grace & Co.-Conn. through its Grace Packaging group. The VFFS process is known to those of skill in the art, and described for example in U.S. Pat. No. 4,589,247 (Tsuruta et al), incorporated herein by reference. A flowable product is introduced through a central, vertical fill tube to a formed tubular film having been sealed transversely at its lower end, and longitudinally. The pouch is then completed by sealing the upper end of the tubular segment, and severing the pouch from the tubular film above it.

The choice of packaging materials is important, and should be matched to the intended end use of the pouch.

Several ways of dispensing the contents of such pouches at their point of use, such as a restaurant, commissary, or the like, have been proposed. One is the use of an internal fitment sealed to the interior surface of a pouch wall, such as the ASEPT™ fitment distributed in the U.S. by the assignee of the present application, and disclosed in U.S. Pat. No. 4,603,793 (Stern). In use, a coupling device would be inserted through the pouch material to communicate with the internal fitment, and a conventional dispensing device would be connected to the coupling device for delivering measured portions of the contents of the pouch.

An alternative technique and apparatus for dispensing the contents of a pouch is the use of a pouring spout such as the TOP-TAP™ pouring spout supplied by DuPont Canada, and described in differing embodiments in their Canadian Pat. No. 1,192,164 (Obidniak) and U.S. Pat. No. 5,325,995 (Harrison et al). This system involves piercing the filled pouch with the sharp end (piercing nozzle) of a pouring spout, and driving the piercing nozzle into the pouch interior until the laminate forming the pouch wall engages the shoulder of the piercing nozzle. When this occurs, the plastic material forming the pouch will dispose around the shoulder of the nozzle, to be secured by a collar. The pouring spout can then be used to dispense the contents of the pouch.

In some cases, a packager may wish to forgo the use of internal or external fitments because of the additional packaging cost associated with such devices.

An alternative is simply to cut open the pouch with a knife at the time that it is desired to access the contents of the pouch, e.g. at the time that the contents of the pouch are to be placed in a dispenser. However, this procedure, although simple, exposes the user to the possibility of injury when cutting open the pouch. Even if the cutting/opening operation is done without injury, this procedure leaves the choice of where to cut the pouch to the person opening the pouch, which can cause spillage of the contained product. Additionally, for insurance reasons, many restaurants, such as some fast food outlets, do not permit knives or the like in the food preparation area of the restaurant.

It would thus often be desirable to avoid the necessity of using fitments, and the haphazard use of a knife or other sharp object to open the pouch, and to provide that the pouch could be simply and easily torn open at a preselected point on the pouch, chosen to make the opening process easier and reduce potential spillage.

However, many VFFS and other packaging applications require the use of packaging materials, especially flexible packaging materials, that can be used to package food or non-food articles and protect these articles during storage and distribution. Where flowable foods are packaged, as in many VFFS applications, the hydrostatic pressure of many oil and water based foods requires a tough, impact and abuse resistant packaging material that will maintain its structural integrity during the packaging process, and subsequent distribution and storage. Film technology has progressed to the point where many films offer a high degree of abuse resistance. Unfortunately, the same properties of toughness and abuse resistance that are desirable for the performance of the packaging material in protecting the contained article, often make it difficult or impossible for the end user to manually open the package without the aid of a knife or the like.

Various solutions to this problem have been proposed with a view to overcoming this problem and making it easier to open packages of the type just described. One is the use of tear notches, perforations, slits, etc. which guide the user to a particular place on the pouch to initiate tear.

However, providing for tear initiation and placement is often not enough. The packaging material must have low enough tear propagation so that the material will continue to tear easily beyond the end point of a tear notch or the like. If tear propagation values for the material are too high, the material will stretch rather than tear, and make it very difficult to properly tear open the pouch.

It would therefore be of great benefit to the packaging industry to provide an easy open tear film compatible with current commercial packaging systems, i.e. a film having good dimensional stability and abuse resistance.

SUMMARY OF THE INVENTION

In one aspect of the invention, a film coextruded comprises a core layer comprising a polyamide; two intermediate layers, disposed on opposite surfaces of the core layer, comprising an adhesive; and two outer layers, each disposed on a surface of the respective intermediate layer, comprising an ethylene/alpha olefin co-polymer; wherein the two outer layers each comprise at least 27% of the total thickness of the film.

In a second aspect of the invention, a process for making a film comprises coextruding a film comprising a core layer comprising a polyamide; two intermediate layers, disposed on opposite surfaces of the core layer, comprising an adhesive; and two outer layers, each disposed on a surface of the respective intermediate layer, comprising an ethylene/alpha olefin copolymer; and blowing the film by a hot blown process up to a blow-up ratio of between 2.0:1 and 3.0:1.

In a third aspect of the invention, a package comprises a flowable food product; and a pouch containing the food product, the pouch made from a film comprising a core layer comprising a polyamide; two intermediate layers, disposed on opposite surfaces of the core layer, comprising an adhesive; and two outer layers, each disposed on a surface of the respective intermediate layer, comprising an ethylene/alpha olefin copolymer; wherein the two outer layers each comprise at least 27% of the total thickness of the film.

Definitions

The term "core layer" as used herein refers to the central layer of a multi-layer film. In the present invention, it can comprise either a single polyamide layer, or three layers wherein two layers of polyamide have therebetween a layer comprising an adhesive.

The term "outer layer" as used herein refers to what is typically an outermost, usually surface layer of a multi-layer film, although additional layers and/or films can be adhered to it.

The term "intermediate" as used herein refers to a layer of a multi-layer film which is between an outer layer and core layer of the film.

"Polymer" herein includes homopolymer, copolymer, terpolymer, etc. "Copolymer" herein includes copolymer, terpolymer, etc.

"Polyamide" is used herein to mean both polyamides and copolyamides, and means a polymer in which amide linkages (—CONH—) occur along the molecular chain. Examples are nylon 6, nylon 11, nylon 12, nylon 66, nylon 69, nylon 610, nylon 612, nylon 6/66, and amorphous nylon.

"Adhesive" refers to adhesives, preferably polymeric adhesives, more preferably polyolefins having an anhydride functionality grafted thereon and/or copolymerized therewith and/or blended therewith. "Anhydride functionality" refers to any form of anhydride functionality, such as the anhydride of maleic acid, fumaric acid, etc., whether grafted onto a polymer, copolymerized with a polymer, or blended with one or more polymers, and is also inclusive of derivatives of such functionalities, such as acids, esters, and metal salts derived therefrom. More generally, "adhesive" refers to any material that adheres a polyamide layer to another polyamide layer, or to an ethylene/alpha-olefin copolymer such as LLDPE.

As used herein, the phrase "ethylene/alpha-olefin copolymer" (EAO) refers to such heterogeneous materials as linear medium density polyethylene (LMDPE), linear low density polyethylene (LLDPE), and very low and ultra low density polyethylene (VLDPE and ULDPE); as well as homogeneous polymers (HEAO) such as TAFMER™ ethylene/alpha olefin copolymers supplied by Mitsui Petrochemical Corporation and metallocene-catalyzed polymers such as EXACT™ materials supplied by Exxon. These materials generally include copolymers of ethylene with one or more comonomers selected from $C_4$ to $C_{10}$ alpha-olefins such as butene-1. (i.e., 1-butene), hexene-1, octene-1, etc. in which the molecules of the copolymers comprise long chains with relatively few side chain branches or cross-linked structures. This molecular structure is to be contrasted with conventional low or medium density polyethylenes which are more highly branched than their respective counterparts. Other ethylene/alpha-olefin copolymers, such as the long chain branched homogeneous ethylene/alpha-olefin copolymers available from the Dow Chemical Company, known as AFFINITY™ resins, are also included as another type of ethylene/alpha-olefin copolymer useful in the present invention.

"Linear low density polyethylene" (LLDPE) as used herein has a density in the range of from about 0.916 to 0.924 grams per cubic centimeter. "Linear medium density polyethylene" (LMDPE) as used herein, has a density from 0.930 grams per cubic centimeter to 0.939 grams per cubic centimeter. "High density polyethylene" (HDPE), as defined herein, has a density of 0.94 grams per cubic centimeter or more.

The term "ethylene/ester copolymer" (E/E) as used herein refers to a copolymer formed from ethylene and an ester such as vinyl acetate, alkyl acrylate, or other monomers, wherein the ethylene derived units in the copolymer are present in major amounts and the ester derived units in the copolymer are present in minor amounts.

"Heat shrinkable" is defined herein as a property of a material which, when heated to an appropriate temperature above room temperature (for example 96° C.), will have a free shrink of 5% or greater in at least one linear direction.

"Flowable materials" herein means food or non-food items which are flowable under gravity, or can be pumped, as defined in U.S. Pat. No. 4,521,437 (Storms), incorporated by reference herein in its entirety.

All compositional percentages used herein are calculated on a "by weight" basis.

DESCRIPTION OF THE PREFERRED EMBODIMENTS

Figure 1:
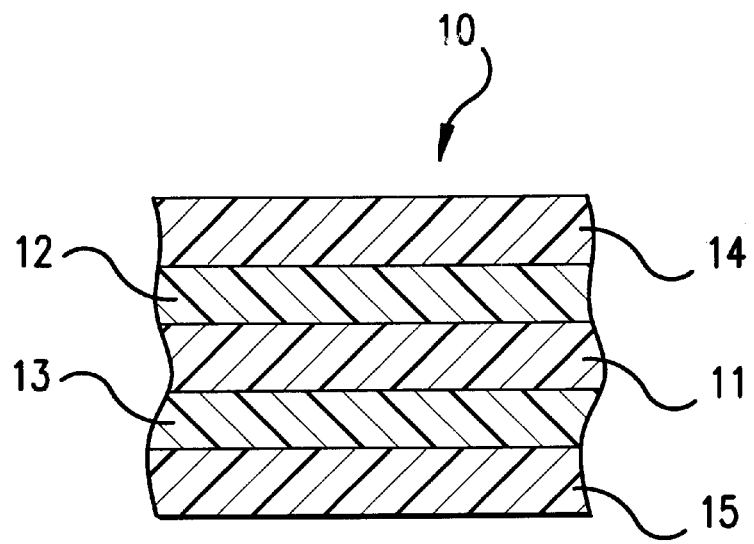
FIG. 1 is a cross-sectional view of a five layered embodiment of the present invention.

Referring to FIG. 1, which is a cross-sectional view of a five layered embodiment of the present invention, it is seen that this embodiment is a film 10 comprising a core layer 11, two intermediate layers 12 and 13, and two outer layers 14 and 15. Outer layers 14 and 15 are preferably surface layers.

Core layer 11 comprises a polyamide. Preferred polyamides include nylon 6, nylon 11, nylon 12, nylon 66, nylon 69, nylon 610, nylon 612, nylon 6/66, and amorphous nylon.

Intermediate layers 12 and 13 comprise a polymeric adhesive. Outer layers 14 and 15 comprise ethylene/alpha-olefin copolymer. A preferred material is linear low density polyethylene.

Figure 2:
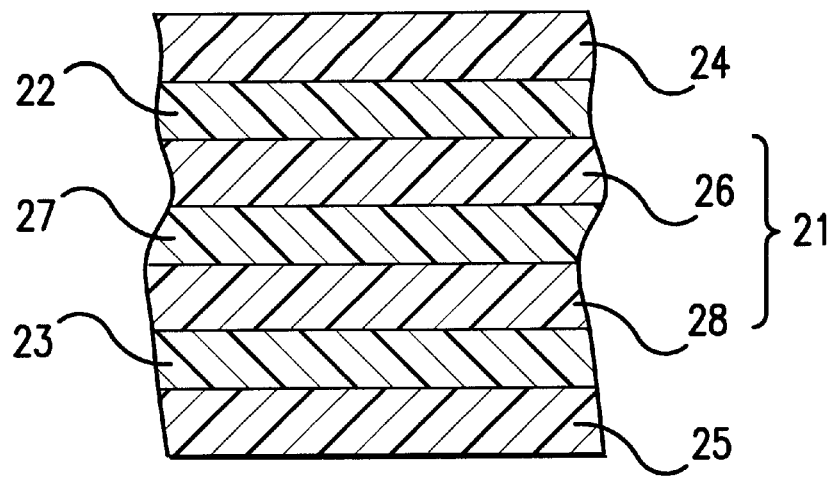
FIG. 2 is a cross-sectional view of a seven layered embodiment of the present invention.

FIG. 2 shows a preferred seven layer film with a core layer 21, two intermediate layers 22 and 23, and two outer layers 24 and 25. Outer layers 24 and 25 are preferably surface layers.

The core layer 21 in this embodiment actually includes three layers wherein two layers 26 and 28 comprise polyamide, and have therebetween a layer 27 comprising a polymeric adhesive.

Layers 26 and 28 can be selected from those disclosed above for layer 11 of the five layer film.

Layer 27, and intermediate layers 22 and 23, can comprise the same materials as those described above for layers 12 and 13 of the five layer film.

Layers 24 and 25 can comprise the same materials as those described above for layers 14 and 15 of the five layer film.

For either embodiment, other polymeric materials can optionally be included in the core, intermediate, or outer layers in addition to the polyamide, as long as the tear propagation values discussed further herein can be obtained, and as long as the layer in which these materials are included, and the overall film, function adequately for its intended end use. Examples of these additional materials are ethylene polymer or copolymers such as LLDPE or VLDPE; ethylene/ester copolymer, such as ethylene/vinyl ester copolymer, e.g. ethylene/vinyl acetate copolymer, or ethylene/alkyl acrylate copolymer, e.g. ethylene/ethyl acrylate copolymer, ethylene/methyl acrylate copolymer, or ethylene/butyl acrylate copolymer; or ethylene/acid copolymer, such as ethylene/acrylic acid copolymer, or ethylene/methacrylic acid copolymer. Blends of these materials in any suitable proportion can also be used.

The invention can be further understood by reference to the examples given below. Final film thicknesses can vary, depending on process, end use application, etc. Typical thicknesses range from 0.1 to 20 mils, more preferably 1 to 10 mils, and especially 2 to 7 mils. Table 1 identifies the materials used in the examples. The remaining tables describe the properties of films made with these materials.

TABLE 1

| Material | Tradename | Source |
|---|---|---|
| PA1 | ULTRAMID ™ KR-4407 film | BASF |
| PE1 | DOWLEX ™ NG 3347A | Dow |
| PE2 | DOWLEX ™ 2045.03 | Dow |
| PE3 | ESCORENE ™ LD-102.69 | Exxon |
| PE4 | DOW ™ 609 A | Dow |
| AD1 | 10853 antiblock polyethylene masterbatch | Ampacet |
| Tie1 | TYMOR ™ 1228B | Morton International |

PA1 is a nylon 6 (polycaprolactam).

PE1 is a linear low density polyethylene (LLDPE) with a density of 0.917 grams/cubic centimeter. PE1 is an ethylene/1-octene copolymer.

PE2 is a linear low density polyethylene (LLDPE) with a density of 0.920 grams/cubic centimeter. PE2 is an ethylene/1-octene copolymer with an octene content of 6.5% by weight of the overall polymer.

PE3 is a low density polyethylene with a density of 0.92 grams/cubic centimeter.

PE4 is a low density polyethylene with a density of 0.92 grams/cubic centimeter.

AD1 is an additive masterbatch having about 80% LLDPE with a density of 0.918 grams/cubic centimeter, and about 20% diatomaceous earth.

Tie1 is a polymeric adhesive comprising an anhydride grafted ethylene/butene copolymer with a density of 0.921 grams/cubic centimeter.

In Tables 2 and 3, two five-layer film structures in accordance with the invention are disclosed. Example 1 is a five-layer film; Example 2 is a seven layer film. These were each made by a coextrusion process, where the coextrudate was hot blown to a blow up ratio of about 2.2:1 to produce a film having an average thickness (four specimens for each example) of between about 5.0 and 5.3 mils. Example 1 had the structure: A/B/C/B/A where:

A=72% PE2+25% PE4+3% AD1;
B 100% tie1; and
C=100% PA1.

Example 2 had the structure: A/B/C/B/C/B/A where:

A=72% PE1+25% PE3+3% AD1;
B=100% tie1; and
C=100% PA1.

TABLE 2

(Example 1)

| Physical Property | Specimen 1 | Specimen 2 | Specimen 3 | Specimen 4 |
|---|---|---|---|---|
| Tear Propagation (gms)[a] | | | | |
| LD | 284.1 | 324.5 | 292.8 | 296.8 |
| TD | 405.0 | 431.6 | 448.9 | 443.5 |

TABLE 3

(Example 2)

| Physical Property | Specimen 1 | Specimen 2 | Specimen 3 | Specimen 4 |
|---|---|---|---|---|
| Tear Propagation (gms)[a] | | | | |
| LD | 239.6 | 297.3 | * | * |
| TD | 279.8 | * | 280.5 | 294.3 |

Example 3 had a film structure and formulation like Example 2, but had an average thickness (four specimens) of about 4.7 mils.

TABLE 4

(Example 3)

| Physical Property | Specimen 1 | Specimen 2 | Specimen 3 | Specimen 4 |
|---|---|---|---|---|
| Tear Propagation (gms)[a] | | | | |
| LD | 253.7 | 255.2 | 221.6 | 290.8 |
| TD | 338.3 | 307.2 | 348.5 | 314.0 |

Example 4 had a film structure and formulation like Example 2, but had an average thickness (four specimens) of about 4.2 mils.

TABLE 5

(Example 4)

| Physical Property | Specimen 1 | Specimen 2 | Specimen 3 | Specimen 4 |
|---|---|---|---|---|
| Tear Propagation (gms)[a] | | | | |
| LD | 242.7 | 246.6 | 204.0 | 228.7 |
| TD | 245.5 | 229.6 | 235.4 | 280.8 |

Example 5 had a film structure and formulation like Example 1, and had an average thickness (five specimens) of 5.0 mils.

TABLE 6

(Example 5)

| Physical Property | Specimen 1 | Specimen 2 | Specimen 3 | Specimen 4 | Specimen 5 |
|---|---|---|---|---|---|
| Tear Propagation (gms)[a] | | | | | |
| LD | 235.6 | 315.4 | 242.0 | 454.5** | 297.8 |
| TD | 457.3 | 431.4 | 470.7 | 486.7 | — |

**data is questionable in view of values obtained for longitudinal direction for specimens 1 to 3 and 5.

Figure 3:
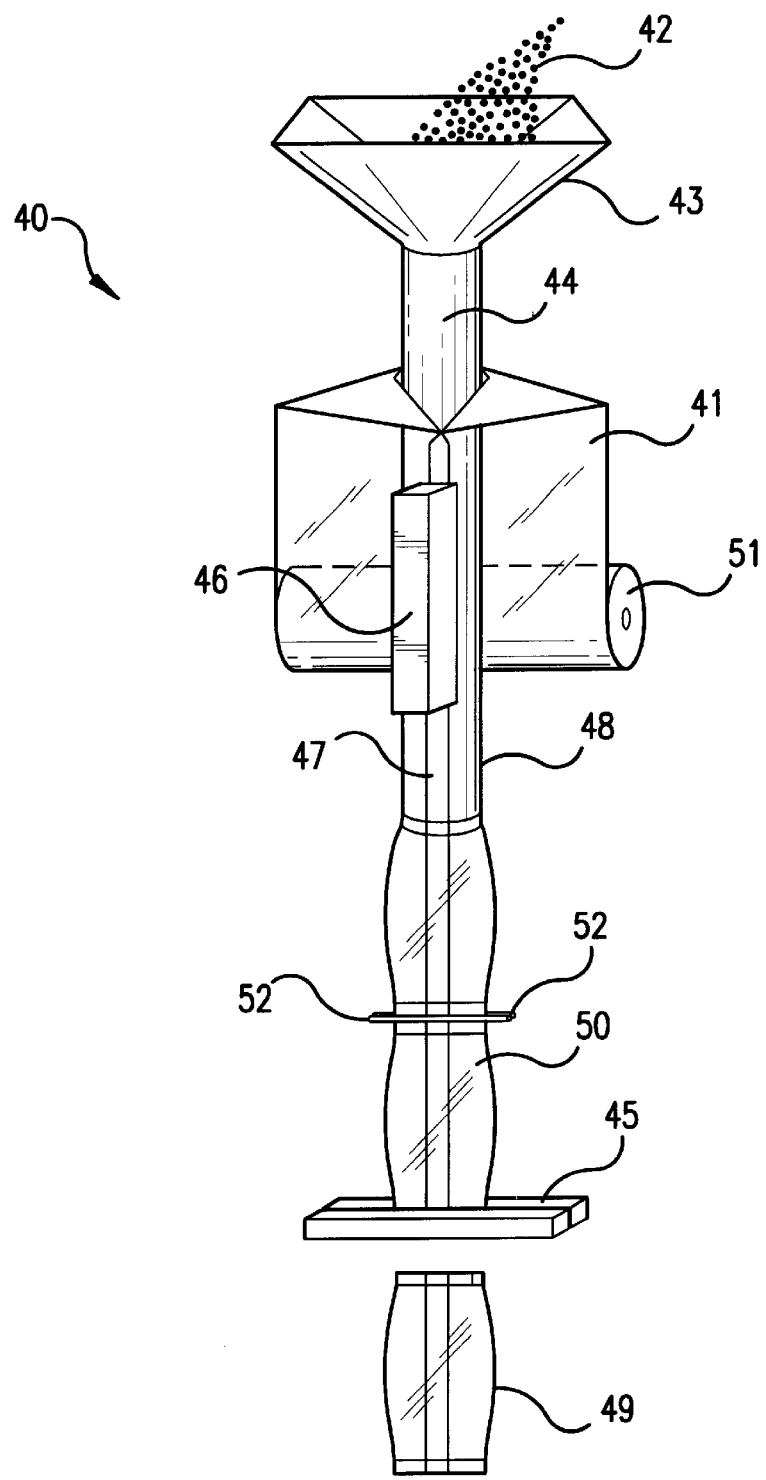
FIG. 3 illustrates a vertical form fill and seal apparatus which can be used in connection with the present invention.

FIG. 3 illustrates a vertical form fill and seal apparatus to be used in packaging process according to the present invention. Vertical form fill and seal equipment is well known to those of skill in the packaging arts, as exemplified by U.S. Pat. No. 4,506,494, to Shimoyama et al., which is hereby incorporated in its entirety, by reference thereto.

In FIG. 3, a vertical form fill and seal apparatus 40 is schematically illustrated. Vertical form fill and seal equipment and processes are well known to those of skill in the packaging art. The following documents disclose a variety of equipment suitable for vertical form fill and seal: U.S. Pat. No. 2,956,383; U.S. Pat. No. 3,340,129 to J. J. Grevich; U.S. Pat. No. 3,611,657, to Kiyoshi Inoue, et. al.; U.S. Pat. No. 3,703,396, to Inoue, et. al.; U.S. Pat. No. 4,103,473, to Bast, et al.; U.S. Pat. Nos. 4,589,247; 4,532,752, to Taylor; U.S. Pat. No. 4,532,753, to Kovacs; U.S. Pat. No. 4,571,926, to Scully; and Great Britain Patent Specification No. 1,334,616, to de Groot, et al. Apparatus 40 utilizes multilayer film 41 according to the present invention. Product 42, to be packaged, is supplied to apparatus 40 from a source (not illustrated), from which a predetermined quantity of product 42 reaches upper end portion of forming tube 44 via funnel 43, or other conventional means. The packages are formed in a lower portion of apparatus 40, and flexible sheet material 41 from which the bags or packages are formed is fed from roll 51 over certain forming bars (not illustrated), is wrapped about forming tube 44, and is provided with longitudinal seal 47 by longitudinal heat sealing device 46, resulting in the formation of vertically-oriented tube 48. End seal bars 45 operate to close and seal horizontally across the lower end of vertically-sealed tube 48, to form pouch 50 which is thereafter immediately packed with product 42. A means for advancing and/or voiding a portion of the tube 48, such as film drive rollers 51, advance tube 48 and pouch 50 a predetermined distance, after which end seal bars 45 close and simultaneously seal horizontally across the lower end of vertically-sealed tube 48 as well as simultaneously sealing horizontally across upper end of sealed pouch 49, to form a product packaged in sealed pouch 49. The next pouch 50, thereabove, is then filled with a metered quantity of product 42, advanced, and so on. It is also conventional to incorporate with the end seal bars a cut-off knife (not shown) which operates to sever a lower sealed pouch 49 from the bottom of upstream pouch 50.

Films of the present invention preferably have "balanced" tear propagation properties. That is, preferred films have a tear propagation in the longitudinal direction that is substantially equal to the tear propagation of the film in the transverse direction. Alternatively, the difference between the tear propagation in the longitudinal direction and the tear propagation in the transverse direction is less than 70%.

To further understand the invention, and to compare its performance with a conventional film, as well as to determine fitness-for-use of film structures in certain applications, a series of tests was run. These tests include dimensional stability, compression testing, individual pouch drop testing, frozen abuse testing, seal strength analysis, and analytical evaluation. Each of these is discussed in more detail below.

The film of the invention was either the film of Example 5 (5 mils thick) or one like that of Example 5, but differing in thickness. Thus, Example 6 is like Example 5, but 3 mils thick; Example 7 is like that of Example 5, but 3.5 mils thick. The films of the invention had outermost layers comprising linear low density polyethylene, and each outermost layer comprised 33% of the total thickness of the film.

The comparative film was C-300, a commercial packaging material sold by W. R. Grace & Co.-Conn. through its Grace Packaging group. This material is a five layer film made by a cast process, and has a core layer of nylon 6, and outermost layers of a blend of 90% of linear low density polyethylene and 10% of a color masterbatch having a low density polyethylene carrier. The outermost layers each comprise 26.6% of the total thickness of the film. An intermediate layer is present between the core layer and each outermost layer, and comprises an anhydride-grafted polymeric adhesive. In the Tables below, the comparative material appears in two different gauges.

1. Dimensional Stability

During this test, a series of empty pouches, each having a bottom seal and open on one end, were placed into the cavity of a pouch tester, and a tight fitting air hose was clamped into the opening of each pouch in turn. This sealed the pouches shut. The pouch tester was a LRVP (Linear Ramp, Variable Pressure) Hot Burst Tank. It was of stainless steel construction, consisting mainly of a container that held approximately 30 gallons of hot water. The container was four feet wide, 3 ½ feet long, and four feet high. On the top front of this unit was a hinged, Plexiglas™ shield that opened and closed to allow samples to be placed inside as well as for viewing the evaluation. On top of the tester, behind the shield, was a raised stainless unit that housed the control panel and adjustments. Inside the Plexiglas™ shield, where the hot water was contained, was an arm that held the bag/pouch/sample to be tested above the water.

For each pouch tested, once the pouch was in place, the shield was closed, air pressure was applied, and the pouch was lowered into the heated water. Several hundred plastic balls floated on the top of the water to suppress any splash that could occur when/if the pouch burst. The machine cycled for a preset time, or until pouch failure, when it automatically raised the pouch and opened the shield. Light emitting diodes indicated the time or pressure at which the pouch burst.

The pouches were initially empty. When the testing cycle was initiated, air was forced into each pouch through a clamp at the top of the pouch as it was lowered into a vat of hot water (185° F.) for a preset period of time (10 seconds).

This procedure simulated the hot-filling operation of the ONPACK VFFS equipment. In a commercial packaging environment, air pressure, combined with a hot aqueous liquid food product, can cause the packaging film to become very elastic and undesirably stretch or herniate. Under production conditions, this stretching contributes to package weight variation due to variation in volume in different pouches. That is, the more a pouch stretches, the more product it will hold. If the amount of stretching varies from pouch to pouch, then the weights of packages made from those pouches will vary as well.

This phenomena is undesirable in commercial operations.

To measure differences in the film, five pouches of each film type and gauge were tested under the same conditions. After the specified time in the hot water, each pouch was removed and measured. One inch strips were cut from two places on the pouch. The first sample was taken from an area not subjected to the air pressure and hot water (the control). The second sample was taken from the area that was subjected to the air and hot water. The widest circumference for each pouch was used to determine the maximum amount of stretch under these conditions. These one inch strips were cut and laid flat and measured. The difference of the two measurements is indicative of the amount of stretch seen by that film type. Table 7 summarizes the results seen.

TABLE 7

Results of Dimensional Stability Evaluation of Blown and Cast Films.

| Film Type | Control Length (mm) | Test Length (mm) | Difference (mm) | Percent Increase |
|---|---|---|---|---|
| C300 (3 mil) | | | | |
| #1 | 507 | 748 | 241 | 47.5 |
| #2 | | Pouch Failure | NA | NA |
| #3 | | Pouch Failure | NA | NA |
| #4 | | Pouch Failure | NA | NA |
| #5 | 512 | 955 | 443 | 86.5 |
| | | | | Avg. = 67* |
| C300 (4.5 mil) | | | | |
| #1 | 511 | 750 | 239 | 46.8 |
| #2 | 511 | 681 | 170 | 33.3 |
| #3 | 511 | 641 | 130 | 25.4 |
| #4 | 510 | 704 | 194 | 38.0 |
| #5 | 513 | 717 | 204 | 39.8 |
| | | | | Avg. = 36.7 |
| Example 6 (3 mil) | | | | |
| #1 | 473 | 489 | 16 | 3.4 |
| #2 | 478 | 491 | 13 | 2.7 |
| #3 | 475 | 489 | 14 | 2.9 |
| #4 | 475 | 492 | 17 | 3.6 |
| #5 | 475 | 489 | 14 | 2.9 |
| | | | | Avg. = 3.1 |
| Example 5 (5 mil) | | | | |
| #1 | 475 | 480 | 5 | 1.1 |
| #2 | 475 | 482 | 7 | 1.5 |
| #3 | 474 | 480 | 6 | 1.3 |
| #4 | 472 | 483 | 11 | 2.3 |
| #5 | 473 | 480 | 7 | 1.5 |
| | | | | Avg. = 1.5 |

The films of the invention showed less distortion than the comparative films. The comparative films tended to become "pear shaped".

2. Compression Testing

Compression testing was conducted to help determine the amount of compression an individual pouch could withstand. This type of testing can cause failure either at the end seal or in the body of the pouch. To conduct this test, individual pouches (100 ounces of ambient water in each pouch) were placed in a compression device. This device has two metal plates, approximately 8" by 14", hinged directly over each other on one end. From the other end of the two plates, two arms extend approximately 18" out. The device is laid on the floor, a pouch is placed between the two plates and they are closed down together. To get the high pressure needed to produce a failure, the operator must stand on one of the arms. Often, the pressure needed is so high that the operator must hop up and down to get the increasing pressure require. A gauge, located on the top plate, measures the highest force exerted on the pouch at failure. This pressure device is used by several commercial food processors.

For the test, five pouches of each structure were produced and held to hydrate for several days. The pouches were tested until each failed, and the pressure exerted at failure was recorded. Table 8 summarizes the results.

TABLE 8

Results of Compression Testing.

| Film | C300 (3 mil) | C300 (4.5 mil) | RDX-3193 (3.5 mil) | RDX-3193 (5 mil) |
|---|---|---|---|---|
| #1 | 5.4 | 7.4 | 10.0 | 15.2 |
| #2 | 5.5 | 7.4 | 10.3 | 13.2 |
| #3 | 5.5 | 8.4 | 10.3 | 13.0 |
| #4 | 5.5 | 7.9 | 9.0 | 13.5 |
| #5 | 5.0 | 7.9 | 9.9 | 13.3 |
| Average | 5.38 | 7.8 | 9.9 | 13.6 |
| Std. Deviation | 0.217 | 0.418 | 0.534 | 0.891 |
| PSI/mil | 1.79 | 1.73 | 2.8 | 2.7 |

3. Individual Pouch Drop Test

Individual pouch drop tests are conducted to determine the amount of abuse an individual pouch can be expected to withstand. To conduct this test, each pouch was held flat (with the end seals out) and dropped by hand at increasing heights. Each pouch was dropped once from a height of three feet, then once from a height of four feet, and then up to six times from a height of five feet. The height and number of the drop was recorded and the average number of drops survived was calculated for comparison. This test was conducted with hydrated pouches (which were filled with 500 milliliters of water and retained for at least 24 hours) as well as non-hydrated pouches (which were filled and tested within 15 minutes). Tables 9 and 10 summarize the results.

TABLE 9

Results of Individual Pouch Drop Test (Hydrated Pouches).

| Film | Pass/ Fail | Highest Height Dropped | Total # of Drops @ 5' | Number of Drops Survived | Comments |
|---|---|---|---|---|---|
| Example 7 (3.5 mil) | | | | | |
| #1 | Fail | 5' | 6 | 7 | Seal failure |
| #2 | Pass | 5' | 6 | 8 | No leakers |
| #3 | Pass | 5' | 6 | 8 | No leakers |
| #4 | Pass | 5' | 6 | 8 | No leakers |
| #5 | Pass | 5' | 6 | 8 | No leakers |
| | | | | Avg. = 7.8 | |
| Example 5 (5 mil) | | | | | |
| #1 | Pass | 5' | 6 | 8 | No leakers |
| #2 | Pass | 5' | 6 | 8 | No leakers |
| #3 | Fail | 5' | 3 | 4 | Seal failure |
| #4 | Fail | 5' | 4 | 5 | Seal failure |
| #5 | Pass | 5' | 6 | 8 | No leakers |
| | | | | Avg. = 6.6 | |
| C300 (3 mil) | | | | | |
| #1 | Fail | 4' | 1 | 1 | Seal failure |
| #2 | Fail | 5' | 3 | 4 | Sidewall split |
| #3 | Fail | 5' | 3 | 4 | Seal failure |

TABLE 9-continued

Results of Individual Pouch Drop Test (Hydrated Pouches).

| Film | Pass/ Fail | Highest Height Dropped | Total # of Drops @ 5' | Number of Drops Survived | Comments |
|---|---|---|---|---|---|
| #4 | Fail | 5' | 2 | 3 | Seal failure |
| #5 | Pass | 5' | 6 | 8 | No leakers |
|  |  |  |  | Avg. = 4.0 |  |
| C300 (4.5 mil) |  |  |  |  |  |
| #1 | Pass | 5' | 6 | 8 | No leakers |
| #2 | Fail | 5' | 3 | 4 | Seal failure |
| #3 | Fail | 5' | 1 | 2 | Seal failure |
| #4 | Pass | 5' | 6 | 8 | No leakers |
| #5 | Fail | 5' | 1 | 2 | Seal failure |
|  |  |  |  | Avg. = 4.8 |  |

TABLE 10

Results of Individual Pouch Drop Test (Non-hydrated Pouches).

| Film | Pass/ Fail | Highest Height Dropped | Total # of Drops @ 5' | Number of Drops Survived | Comments |
|---|---|---|---|---|---|
| RDX 3193 (3.5 mil) |  |  |  |  |  |
| #1 | Fail | 5' | 2 | 3 | Sidewall split |
| #2 | Pass | 5' | 6 | 8 | No leakers |
| #3 | Fail | 5' | 1 | 2 | Seal failure |
| #4 | Pass | 5' | 6 | 8 | No leakers |
| #5 | Fail | 5' | 3 | 4 | Seal failure |
|  |  |  |  | Avg. = 5.4 |  |
| RDX-3193 (5 mil) |  |  |  |  |  |
| #1 | Fail | 5' | 6 | 7 | Seal failure |
| #2 | Fail | 5' | 3 | 4 | Seal failure |
| #3 | Fail | 5' | 1 | 2 | Seal failure |
| #4 | Fail | 5' | 2 | 3 | Seal failure |
| #5 | Fail | 5' | 5 | 6 | Seal failure |
|  |  |  |  | Avg. = 4.4 |  |
| C300 (3 mil) |  |  |  |  |  |
| #1 | Fail | 4' | 1 | 1 | Seal failure |
| #2 | Fail | 4' | 1 | 1 | Seal failure |
| #3 | Fail | 3' | 1 | 0 | Seal failure |
| #4 | Fail | 4' | 1 | 1 | Seal failure |
| #5 | Fail | 3' | 1 | 0 | Seal failure |
|  |  |  |  | Avg. = 0.6 |  |
| C300 (4.5 mil) |  |  |  |  |  |
| #1 | Fail | 4' | 1 | 1 | Seal failure |
| #2 | Fail | 3' | 1 | 0 | Seal failure |
| #3 | Fail | 4' | 1 | 1 | Seal failure |
| #4 | Fail | 4' | 1 | 1 | Seal failure |
| #5 | Fail | 4' | 1 | 1 | Seal failure |
|  |  |  |  | Avg. = 0.8 |  |

4. Frozen Abuse Testing

Frozen abuse tests was conducted to determine if product packaged in the film structures would survive the rigors of transportation and handling under frozen conditions. To simulate this effect, four water-filled pouches of each film were placed in appropriate sized cases and allowed to freeze. To further exaggerate the abuse the pouches would experience, the cases were packed somewhat loosely so as to allow movement during the evaluation. This greatly increased the contact between pouches. One case of each film type was placed on a Lansmont Vibration Table to simulate shipping abuse. The cases were tested for one hour at 0.75G and 5.0 Hz. After the vibration testing, each case was removed and immediately dropped (flat, on the bottom) from a height of two feet. They were then allowed to thaw overnight to inspect for leakers. Table 11 contains the results of this test.

TABLE 11

Results of Frozen Abuse Testing.

| Film | Leakers | Comments |
|---|---|---|
| Example 7 | 4/4 (100%) | Stress cracks in the sidewall |
| Example 5 | 0/4 (0%) | No leakers |
| C300 (3 mil) | 0/4 (0%) | No leakers |
| C300 (4.5 mil) | 1/4 (25%) | Tear at the first rib |

Although the comparative films outperformed the films of the invention in this particular test, experience from commercial applications of the present films suggests that in fact these films perform well in terms of abuse resistance when holding frozen product.

5. Seal Strength Analysis

Several pouches of each sample were sealed on a Vertrod® Sealer. Using a Scot® Tester, which is similar in operation to an Instron® tester, the seal strengths were evaluated. One inch strips of the seal area was cut for each seal tested, and results are reported in pounds per linear inch (pli). Table 12 summarizes the results.

TABLE 12

Seal Strength Analysis

| Film | Number of Samples | Average (in pli) | Std. Dev. |
|---|---|---|---|
| Example 7 | 10 | 11.85 | 0.428 |
| Example 5 | 9 | 16.53 | 0.522 |
| C300 (3 mil) | 10 | 11.83 | 0.646 |
| C300 (4.5 mil) | 10 | 16.63 | 0.827 |

The data demonstrates that films of the invention exhibit high abuse resistance in frozen and hot-fill applications. This abuse resistance includes high impact resistance, and dimensional stability.

These attributes are important in VFFS systems. In such systems, the equipment fills a pouch to a certain level. If the film stretches, too much product is put into the pouch. This phenomenon makes it difficult to standardize pouch dimensions, which leads for example to difficulty in packing off of pouches in shipping boxes of pre-determined size. Therefore, dimensional stability is of great importance.

Films of the present invention have a tear propagation of preferably less than 350 grams (ASTM 1938) in the longitudinal direction, more preferably less than 325 grams, such as less than 300 grams, less than 275 grams, and less than 250 grams. Films of the present invention have a tear propagation of preferably less than 500 grams (ASTM 1938) in the transverse direction, more preferably less than 450 grams, such as less than 400 grams, less than 350 grams, and less than 300 grams. The tear propagation values of films of the present invention are preferably similar in both the longitudinal direction and transverse direction, and preferably differ by less than 70% between the longitudinal and transverse directions, more preferably by less than 60%, such as less than 50%, less than 40%, less than 30%, less than 20%, and less than 10%.

Films of the present invention are made by hot blowing a coextrudate to a blow up ratio of between 2.0:1 and 3.0:1; such as between 2.1:1 and 2.9:1; between 2.2:1 and 2.8:1; and between 2.3:1 and 2.7:1; such as 2.5:1.

Films of the present invention are preferably not heat shrinkable, but can optionally be stretch oriented by convention orientation processes well known in the art, such as the trapped bubble or tenter frame processes, to render the material heat shrinkable.

Films of the present invention can optionally be crosslinked by irradiation, or chemically.

Preferred five layer embodiments of films of the invention have a layer thickness ratio, of layers A/B/C/B/A, of 33/7/20/7/33. Films of the invention have outermost or sealant layers that each comprise at least 27%, more preferably at least 28%, and most preferably at least 30% of the total thickness of the film.

The core layer of films of the invention constitutes preferably between 15% and 25%, most preferably 20%, of the total thickness of the film.

Internal fitments, such as the ASEPT™ fitment distributed in the U.S. by the assignee of the present application, and disclosed in U.S. Pat. No. 4,603,793 (Stern), can be optionally sealed to the interior surface of a pouch wall of a pouch made from the film of the present invention.

What is claimed is:

1. A process for making a film comprising:

a) coextruding a film comprising a core layer comprising a polyamide; two intermediate layers, disposed on opposite surfaces of the core layer, comprising an adhesive; and two outer layers, each disposed on a surface of the respective intermediate layer, comprising an ethylene/alpha olefin copolymer; and b) blowing the film by a hot blown process up to blow-up ratio of between 2.0:1 and 3.0:1;

whereby the film has a tear propagation (ASTM D-1938) value of less then 350 grams in the longitudinal direction, and less than 550 grams in the transverse direction; and wherein the core layer comprises:
 a) a first polyamide layer,
 b) a second polyamide layer, and
 c) a third layer, disposed between the first and second layers, comprising a polymeric adhesive.

* * * * *